(12) United States Patent
Woodell et al.

(10) Patent No.: US 7,733,264 B1
(45) Date of Patent: Jun. 8, 2010

(54) SYSTEM AND METHOD FOR GENERATING WEATHER RADAR INFORMATION

(75) Inventors: Daniel L. Woodell, Cedar Rapids, IA (US); Jeffery A. Finley, Cedar Rapids, IA (US); Marvin L. Hooker, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 40 days.

(21) Appl. No.: 11/904,543

(22) Filed: Sep. 27, 2007

(51) Int. Cl.
*G01S 13/95* (2006.01)
*G01S 13/00* (2006.01)

(52) U.S. Cl. .............. 342/26 B; 342/26 R; 342/175; 342/176; 342/179; 342/180; 342/182; 342/195; 345/418; 345/419; 702/1; 702/2; 702/3

(58) Field of Classification Search ...... 342/26 R–26 D, 342/175–183, 195; 702/1–4; 345/418–420
See application file for complete search history.

(56) References Cited

U.S. PATENT DOCUMENTS

| 3,720,949 | A | * | 3/1973 | Richter | 342/26 D |
|---|---|---|---|---|---|
| 4,222,265 | A | * | 9/1980 | Ravussin | 342/26 D |
| 4,940,987 | A | * | 7/1990 | Frederick | 342/26 D |
| 5,175,551 | A | * | 12/1992 | Rubin | 342/26 B |
| 5,198,819 | A | * | 3/1993 | Susnjara | 342/26 B |
| 5,202,690 | A | * | 4/1993 | Frederick | 342/26 B |
| 5,339,085 | A | * | 8/1994 | Katoh et al. | 342/180 |
| 5,398,033 | A | * | 3/1995 | Michie | 342/26 B |
| 5,583,972 | A | * | 12/1996 | Miller | 345/419 |
| 5,781,146 | A | * | 7/1998 | Frederick | 342/26 B |
| 5,828,332 | A | * | 10/1998 | Frederick | 342/26 B |
| 5,920,276 | A | * | 7/1999 | Frederick | 342/26 B |
| 6,266,063 | B1 | * | 7/2001 | Baron et al. | 345/419 |
| 6,683,609 | B1 | * | 1/2004 | Baron et al. | 345/419 |
| 6,839,018 | B2 | * | 1/2005 | Szeto et al. | 342/26 R |
| 6,879,280 | B1 | * | 4/2005 | Bull et al. | 342/26 B |
| 7,109,913 | B1 | * | 9/2006 | Paramore et al. | 342/26 B |
| 7,209,070 | B2 | * | 4/2007 | Gilliland et al. | 342/26 B |
| 7,242,343 | B1 | * | 7/2007 | Woodell | 342/26 B |
| 7,411,541 | B2 | * | 8/2008 | Khatwa | 342/26 R |
| 7,417,578 | B1 | * | 8/2008 | Woodell et al. | 342/26 R |
| 7,427,943 | B1 | * | 9/2008 | Kronfeld et al. | 342/26 B |
| 2003/0006928 | A1 | * | 1/2003 | Szeto et al. | 342/26 |
| 2006/0077092 | A1 | * | 4/2006 | Gilliland et al. | 342/26 B |

OTHER PUBLICATIONS

S. Nichols, "Honeywell Makes Major Breakthrough in Weather Radar"; Jul. 19, 2004; reprint of an article from "Flight Daily News" on the Internet at flightglobal.com.*
C. Adams, "New Way to View Weather"; Feb. 1, 2005; article on the Internet at aviationtoday.com.*

* cited by examiner

*Primary Examiner*—Bernarr E Gregory
(74) *Attorney, Agent, or Firm*—Matthew J. Evans; Daniel M. Barbieri

(57) ABSTRACT

A weather radar system can be utilized on-board an aircraft. The weather radar system includes processing electronics for sensing weather. The processing electronics is configured to utilize sensed weather data to generate a vertical weather prediction for a given altitude in response to a range and an azimuth. The system can also include a display. The display provides visual indicia of the vertical weather prediction in response to the processing electronics.

20 Claims, 5 Drawing Sheets

SYSTEM AND METHOD FOR GENERATING WEATHER RADAR INFORMATION

BACKGROUND OF THE INVENTION

The present application relates to weather radar systems. More particularly, the present application relates to a weather radar system that displays the presence of weather on a screen configured to provide vertical depictions of the weather.

U.S. Pat. No. 6,424,288 invented by Daniel L. Woodell and assigned to the assignee of the present application discloses systems for and methods of displaying radar information using weather radar systems. Weather radar systems generally include an antenna, a receiver/transmitter circuit, a processor, and a display. The processor is coupled between the display and the receiver/transmitter circuit. The receiver/transmitter circuit is coupled between the processor and the antenna.

The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color multi-function display (MFD) unit that provides color graphical images to represent the severity and location of weather. Conventional weather radar systems include those manufactured by Rockwell Collins, Inc., Honeywell International, Inc. and others.

Conventionally, radar systems processed and displayed data real-time. Each time a pulse was transmitted, the reflected echoes were immediately processed. The echoes were displayed as a single radial line on the indicator at an azimuth angle corresponding to an antenna beam direction. In modern radars such as the Collins MultiScan, instead of immediately displaying data corresponding to reflected echoes, the data is stored in memory for later processing. This memory system has proved sufficient to allow processing of horizontal or vertical scan data.

Aircraft manufacturers desire airborne weather radar systems that may adapt to display not only traditional horizontal plan views of weather but also vertical views. A vertical view correlates weather returns not only with range and azimuth angle but also with altitude.

What is needed is a system and method for efficiently displaying weather data in a vertical view. What is further needed is such a system and method configured to generate weather data for a vertical view based on one or more detected values.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One embodiment of the invention relates to a weather radar system. The system includes processing electronics for sensing weather, the processing electronics utilizing an equation for generating a vertical weather prediction for a given altitude based upon the sensed weather, the equation being associated with a range and an azimuth. The system further includes a display providing visual indicia of the vertical weather prediction in response to the processing electronics.

Another embodiment of the invention relates to a method of displaying weather on a vertical profile screen of a display associated with an aircraft weather radar system. The method includes receiving radar returns, processing the radar returns to determine a presence of weather, and determining a range and azimuth associated with the weather. The method further includes generating a vertical weather prediction using an equation associated with the determined range and azimuth and providing the vertical weather prediction associated with the weather on the vertical profile screen.

Yet another embodiment of the invention relates to an apparatus for displaying weather for an aircraft. The apparatus includes means for determining a presence of weather from weather radar returns, means for generating a vertical weather prediction associated with the weather based upon a range and a horizontal location of the weather, and means for displaying indicia of the weather using the vertical weather prediction.

Alternative examples and other exemplary embodiments relate to other features and combination of features, as may generally be recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1A:
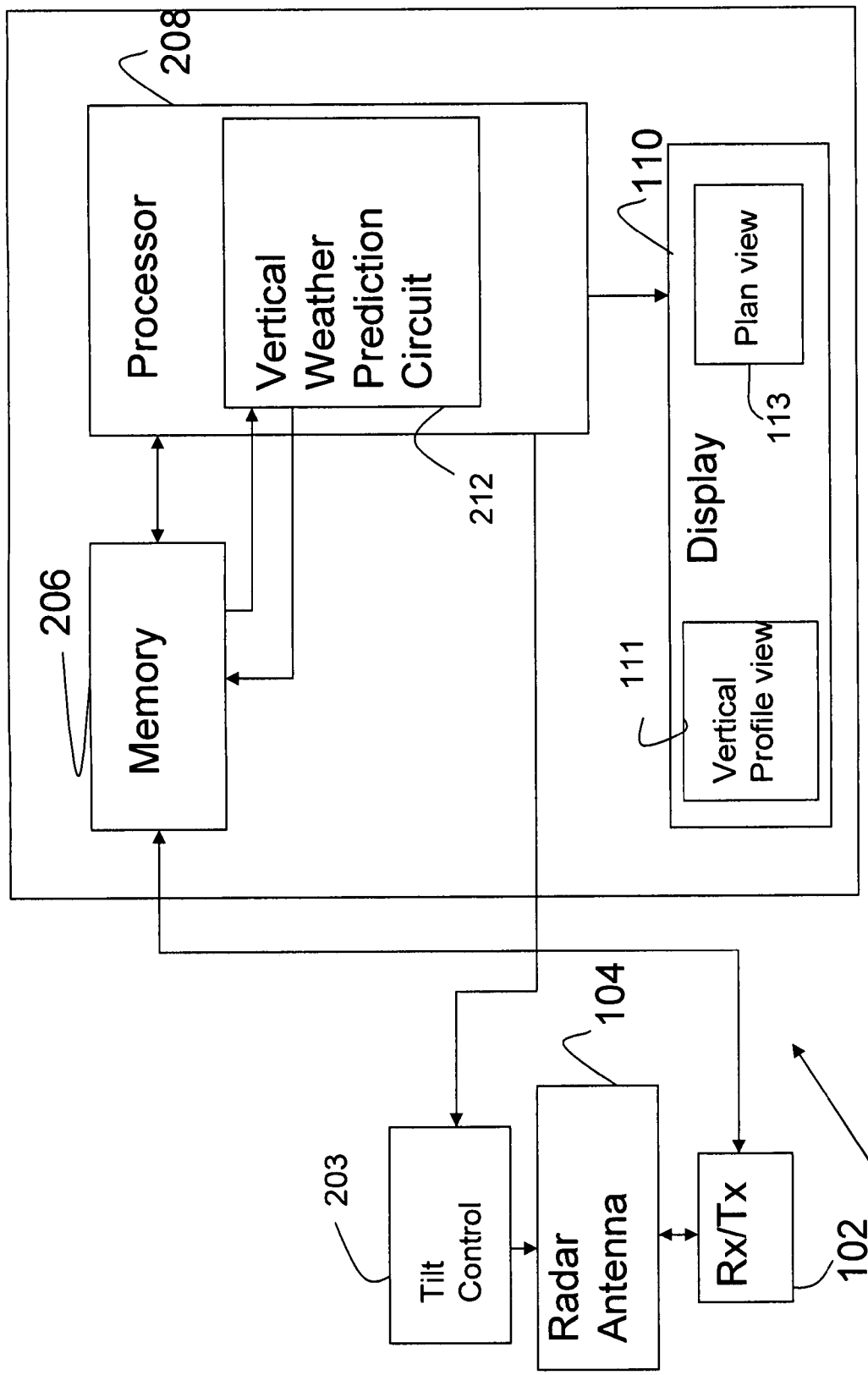
FIG. 1A is a weather radar system which may be used on an aircraft, according to an exemplary embodiment.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1A, a weather radar system 200 which may be used on an aircraft is depicted, according to an exemplary embodiment. Weather radar system 200 can be similar to the systems described in U.S. Pat. Nos. 6,879,280, 6,603,425, and 6,388,608, all incorporated herein by reference. In one embodiment, system 200 is an avionics multi-scan system manufactured by Rockwell Collins, Inc. and configured to include a vertical weather prediction module, routine or circuit 212. Alternatively, a multi-beam radar that stores its data in a volumetric memory such as volumetric scanning systems manufactured by Honeywell, Inc. could be configured to include circuit 212 without departing from the scope of the invention. Vertical weather prediction circuit 212 advantageously determines the presence of weather at altitudes, ranges and locations based on a calculated value that can be displayed to the pilot of an aircraft.

Avionics weather radar system 200 includes a weather radar receiver/transmitter 102, a weather radar adjustable antenna 104, a processor 208, and a multi-scan, multi-tilt angle, memory 206. System 200 also includes a tilt control 203 for automatically controlling the tilt angle (mechanical or electronic) of the antenna 104; this auto control may include an additional manual control feature as well. System 200 can be similar to the system described in U.S. patent application Ser. No. 11/519,564, filed by Woodell on Sep. 12, 2006 and assigned to the assignee of the present application, incorporated herein by reference.

Multi-scan, multi-tilt angle, memory 206 is preferably capable of storing in a readily addressable and rapidly retrievable manner, at least two data sets resulting from two or more antenna sweeps at different angles. Although preferred types of memory are discussed as memory 206, system 200 can utilize any type of storage system capable of storing radar returns or associated data for analysis/processing by processor 208. In one alternative embodiment, memory 206 can store parameters of a weather model.

The data in multi-scan, multi-tilt angle, memory 206 or other storage unit can be used by vertical weather prediction circuit 212 to determine weather that should be displayed on display 110. Although a multi-scan, multi-tilt scanning and data sets are described, it should be understood by one of ordinary skill in the art that a single scan of data may also be used. For example, targets at long ranges over a horizon presents targets that are almost always convective. dBz levels of cells can be used to determine whether the cell is likely to reach the tropopause. In such a scenario, a single scan can be used to generate vertical information. Another such a scenario may occur during initialization of the system. A first sweep may be used to select a correct model from which to generate vertical data.

Weather data can be stored in memory 206. The weather data can be based on received horizontal or vertical scans. The data can be stored as a mathematical equation representation of the information. The mathematical equation representation may be piecewise linear function, piecewise nonlinear functions, coefficients of a cubic spline, coefficients of a polynomial function, etc. that represent vertical representations of the weather based on the horizontal scan data and/or horizontal representation of the weather based on the vertical scan data. The function may be an equation based on weather parameters that may be sensor driven, model driven, a merger of sensor and model, etc. Although horizontal scan data is described, alternative embodiments may include X, Y Cartesian coordinates, rho/theta input, latitude and longitude coordinates, etc. Weather may be estimated for any required point in space with the vertical dimension being the subject of the weather equation.

Display 110 can be part of an avionic multi-function display (MFD) unit. Processor 208 can be a multi-scan, multi-tilt angle, weather radar and can perform the customary functions performed by a conventional weather radar return processing unit, plus it can perform several additional operations based upon the additional data available in multi-scan, multi-tilt angle, memory 206. In general, multi-scan, multi-tilt angle, processor 208 can merge or cross qualify portions, or ranges, of the radar returns of several different antenna sweeps at several different tilt angles, so that a single relatively clutter-free image is presented to the pilot based upon the several separate scans.

Processor 208 can operate according to the scanning process of U.S. Pat. No. 6,424,288. System 200 generally operates by transmitting at least two beams at different tilt angles; system 200 can use the GPS, terrain database, etc. to control the tilt control 203. These returns are stored in multi-scan, multi-tilt angle memory 206. For example, known ground clutter may be removed from each of the returns using well-known ground clutter suppression techniques. Also, ground clutter suppression techniques described in U.S. Pat. No. 6,603,425 could be implemented as well. As described earlier, alternative embodiment may utilize a single sweep to generate the weather prediction.

Convective weather has a vertical reflectivity gradient which extends from the ground to a point where the radar can no longer detect echoes from the weather. This gradient may have similar characteristics from weather cell to weather cell. A typical weather cell will have substantial, nearly constant reflectivity between the ground and the height at which the atmospheric moisture begins to freeze.

Figure 1B:
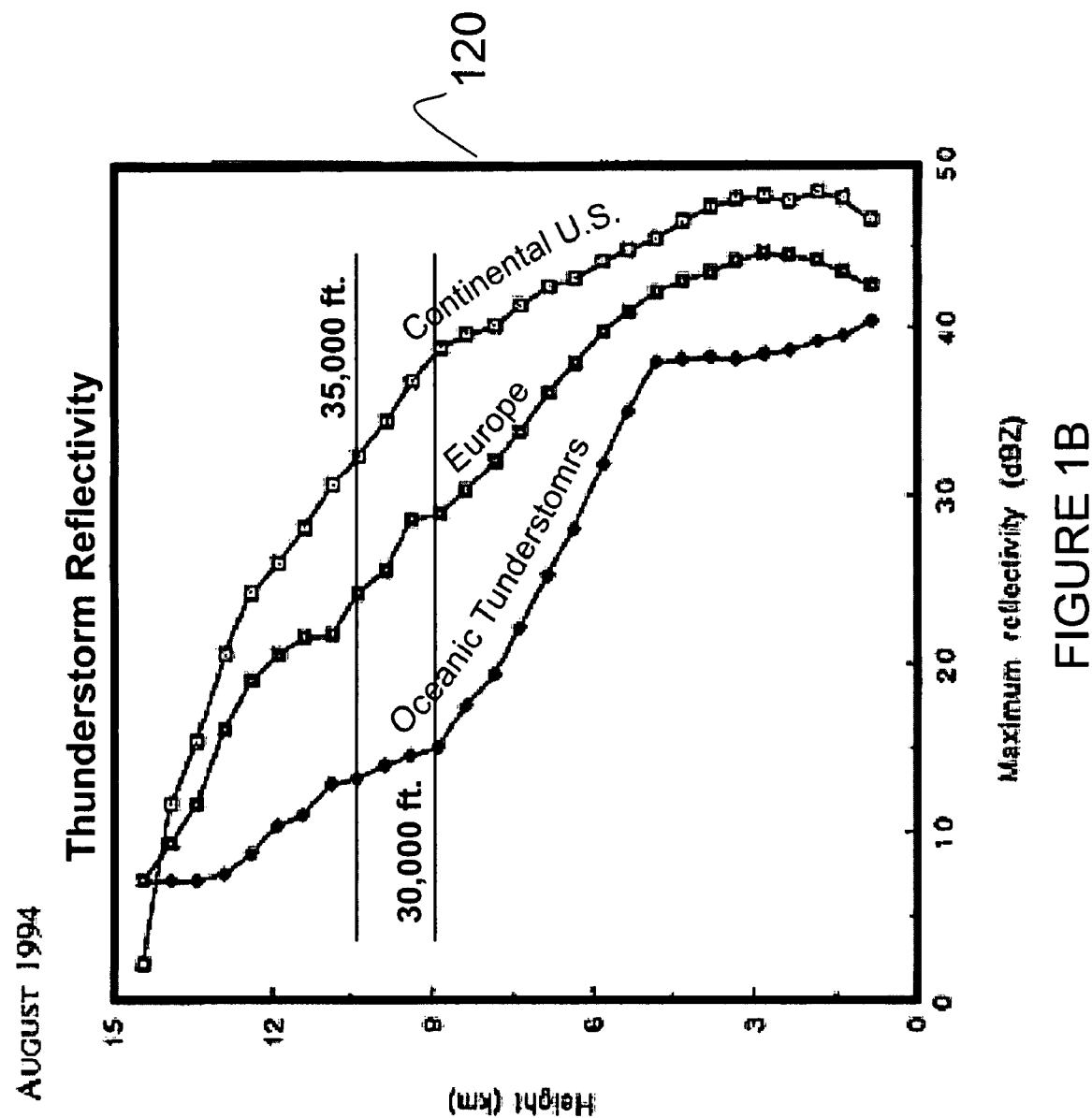
FIG. 1B is a graph showing typical convective cell vertical reflectivity gradients as a function of geographical location, according to an exemplary embodiment.

Above the freezing layer, the reflectivity falls off in a nearly linear manner until the storm generally tops out at the top of the troposphere. Referring now to FIG. 1B, a graph 120 showing typical convective cell vertical reflectivity gradients as a function of geographical location is shown. The graph 120 represents convective cell vertical gradients as shown in Zipser, E. J. and Lutz, K. R., "The Vertical Profile of Radar Reflectivity of Convective Cells," American Meteorological Society, Volume 122, Issue 8, August 1994. Functions representative of these type of gradients may be generated and stored in memory 206 for various range and azimuth locations along a flight path. Coefficients to the functions can be adjusted based on the received weather radar information. For example, some highly energetic weather cells may produce overshooting tops that intrude into the troposphere. A cells energy state can be estimated from it's vertical gradient and dBz level aloft.

Referring again to FIG. 1A, processor 208 is configured to store parametric characteristics of the vertical extent of the weather in memory 206 instead of detecting and storing the entire reflectivity profile in a traditional three-dimensional memory. For example, since the radar knows current altitude and outside air temperature, processor 208 can be configured to estimate the altitude of the local atmospheric freezing layer. Further, processor can estimate the height of the troposphere based on latitude, season, or more precise FMS data. Using this information and radar elevation scan data collected from normal MultiScan two-tilt or three-tilt processes, processor 208 is configured to generate a linear fit of the reflectivity data from the ground to the freezing layer and another linear fit between the freezing layer and top of the troposphere. Details associated with the vertical profile in this embodiment can include the ground height, freezing layer height, the troposphere height, the reflectivity level at ground level, the reflectivity level at freezing layer, and the reflectivity level at the troposphere top. This information is sufficient to generate a function which can generate vertical reflectivity at any altitude.

Alternative embodiments may use more complex curve fits. Specific curve fits can be utilized depending on geographical location, time of day, time of year, etc. For example, over Europe, a linear curve fit may suffice to determine vertical reflectivity between freezing layer and troposphere height whereas a second order fit may be required over the equatorial Pacific. A tag can be given to each cell denoting the specific order of the data fit and, correspondingly, the method used to obtain vertical data from the stored parameters. As additional data is collected, perhaps through dedicated vertical scans of convective cells, the functions can be updated or increased in complexity in order to improve their accuracy.

This process allows a rapid assessment of vertical cell extent with a minimum of data. Rapid assessment may significantly increase the speed of such an assessment in turns or during initial radar power up.

Preferably, processor 208 processes weather radar returns to identify or sense the presence of weather in front of or in view of the aircraft. Vertical weather prediction preferably utilizes the altitude and the range to the weather to generate a vertical profile associated with the weather. The vertical profile can associated with the sensing of the height of the weather system.

After vertical weather prediction circuit 212 generates a vertical profile for the weather based upon altitude and range, display 110 can show vertical profile screen 111 and plan screen 113 simultaneously. Vertical profile screen 111 may be configured to display the vertical profile generated by processor 208.

Vertical weather prediction circuit 212 can be a hardware or software implemented apparatus. In one embodiment, circuit 212 is a software routine that operates within processor 208. Although shown as part of processor 208, circuit 212 can be a separate circuit or be provided between display 110 and processor 208. According to one embodiment, circuit 212 can be implemented upon its own processor platform.

In one embodiment, vertical weather prediction circuit 212 determines the range and altitude associated with the sensed weather. The range and altitude are used so that vertical weather prediction circuit 212 can generate a vertical profile for sensed weather for display on display 210.

Figure 2:
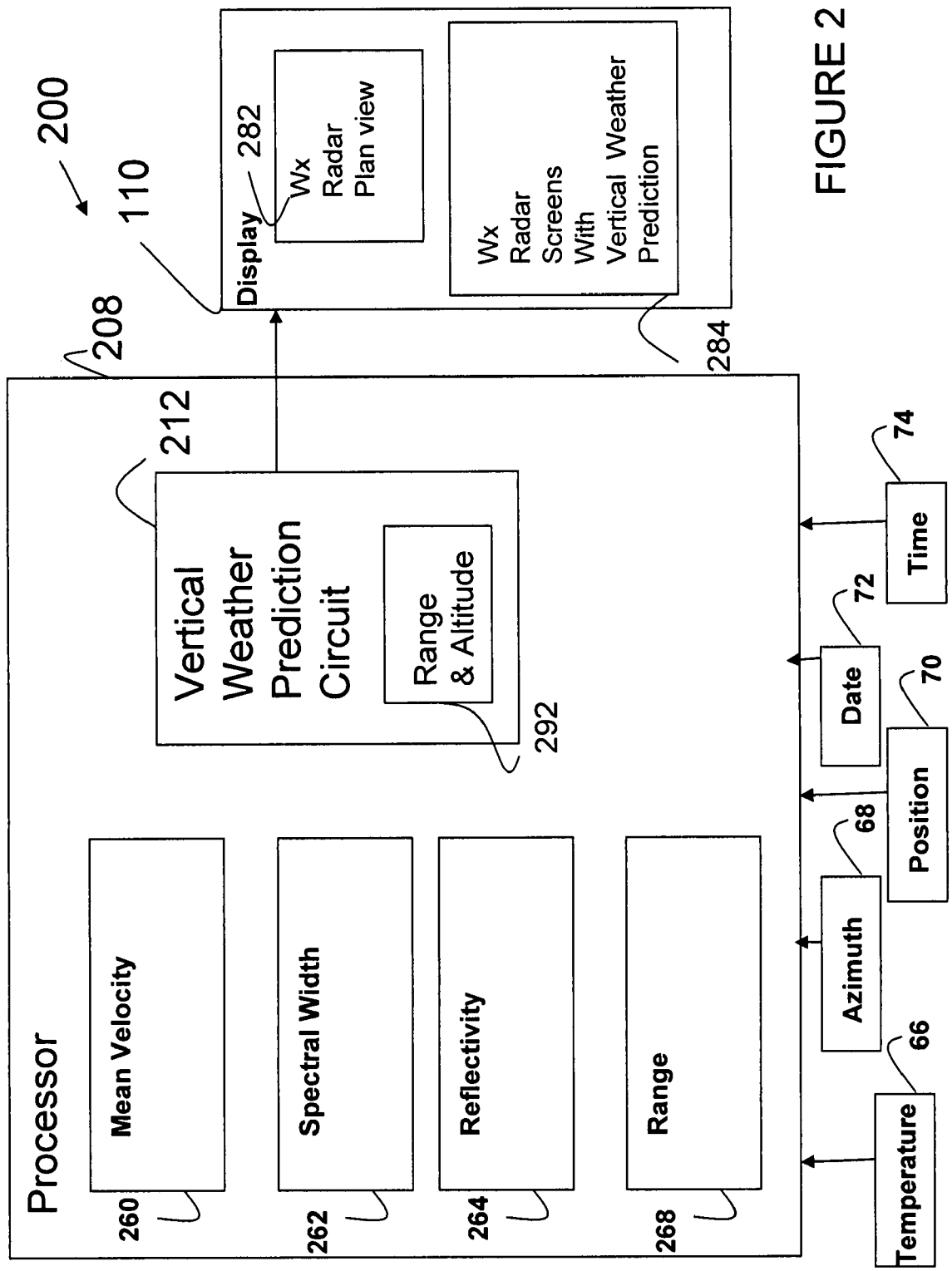
FIG. 2 is a system of FIG. 1 including circuitry to receive additional parameters associated with the weather radar return data, according to an exemplary embodiment.

With reference to FIG. 2, processor 208 of system 200 can receive additional parameters associated with the weather radar return data. The additional parameters can be utilized to improve the quality of the vertical weather prediction.

Processor 208 can provide a mean velocity parameter 260 and a spectral width parameter 262 derived from weather radar returns. Alternatively, other types of velocity parameters can be utilized. In addition, processor 208 can provide a reflectivity parameter 264 and a range parameter 268 to circuit 212. Computed range or range parameter 268 along with scan angle position can be used to plot the position of weather on display 110. Processor 208 can also provide a temperature parameter 66, an azimuth 68, a position 70, a date 72, and time 74. Alternatively, a separate temperature sensor 66 can be coupled to processor 208. Parameters 260, 262, 264, and 268 can be computed by processor 208 using data stored in memory 206.

Processor 208 can use parameters 260, 262, 264, and 268 to determine hazards as discussed in U.S. patent application Ser. No. 11/191,883, incorporated herein by reference, filed Jul. 28, 2005, by Woodell, et al. and assigned to the assignee of the present application incorporated herein by reference. Parameters 260, 262, 264, and 268 can also be used to improve the quality of the vertical weather prediction. For example, if processor 208 determines that the weather includes a convective cell that is growing, that characteristic can be considered when determining the height and or other characteristic of the weather as discussed above.

Display 110 preferably includes a plan view mode weather radar screen 282 and a vertical weather prediction mode screen 284. In one preferred embodiment, the pilot can toggle between screens 282 and 284 based upon a manual input. Alternatively, screen 284 can automatically be provided on display 110 when the aircraft is in a particular flight mode, such as a rapid turn.

In a preferred embodiment, processor 208 and circuit 212 are implemented in software subroutines. The routines can be executed on one or more digital signal processors associated with system 200. In one embodiment, system 200 uses a hardware platform of a WXR-2100 weather radar system manufactured by Rockwell Collins, Inc. or an RDR 4000 weather radar system manufactured by Honeywell International, Inc. However, the present invention is not limited to any type of hardware platform.

Figure 3:
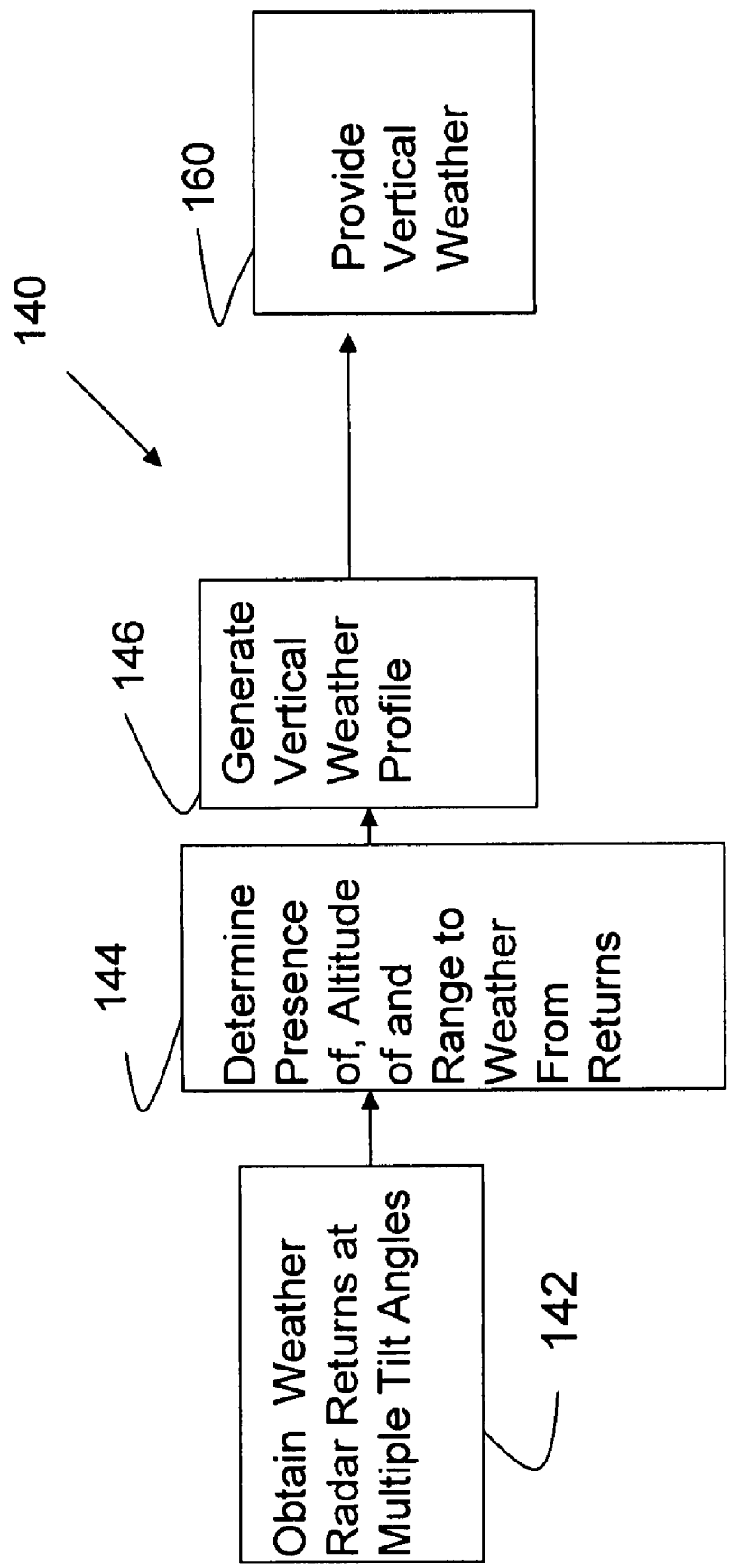
FIG. 3 is a flowchart illustrating a method of generating a vertical weather prediction of sensed weather data, according to an exemplary embodiment.

With reference to FIG. 3, a flowchart 140 illustrates a method in which processor 208 of system 200 provides signals, either directly to receiver/transmitter circuit 102 or indirectly through memory 206, to provide radar beams at radar antenna 104. Preferably, processor 208 is configured to operate system 200 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can receive the radar returns (or signals/data related thereto) directly or through memory 206 at a step 142. Receiver/transmitter circuit 102 can be a single path or can have separate circuits for a receive path and a transmit path. Processor 208 preferably determines power associated with the radar returns.

At a step 144, processor 208 processes the weather radar returns to determine the presence of weather and the altitude and range of weather. In one embodiment, the altitude of weather can be determined by comparing power levels of radar returns at different tilt angles.

At a step 146, vertical weather prediction circuit 212 can generate a vertical weather profile at a given range and over a defined altitude. Vertical weather prediction circuit 212 can generate a vertical profile for a given range and azimuth at an altitude or an altitude range for the weather.

Generating a vertical weather profile can include updating coefficients to a function whose inputs are a horizontal location to the weather and whose output is the reflectivity at any given altitude. The functions may be associated with a grid of horizontal location or may be associated with an individual weather feature such as a weather cell. Low altitude reflectivity can be used as a starting point for the estimation of radar reflectivity at an altitude. Low altitude reflectivity can be modified using the function or any other mathematical construct. The functions inputs may include many factors such as geography, atmospheric state, sensed weather feature horizontal or vertical size, sensed weather feature area, results from other sensor systems, time, date, etc.

At a step 160, image data is provided for eventual conversion to a display signal for display 110. The image data is for providing visual indicia of significant weather.

Figure 4:
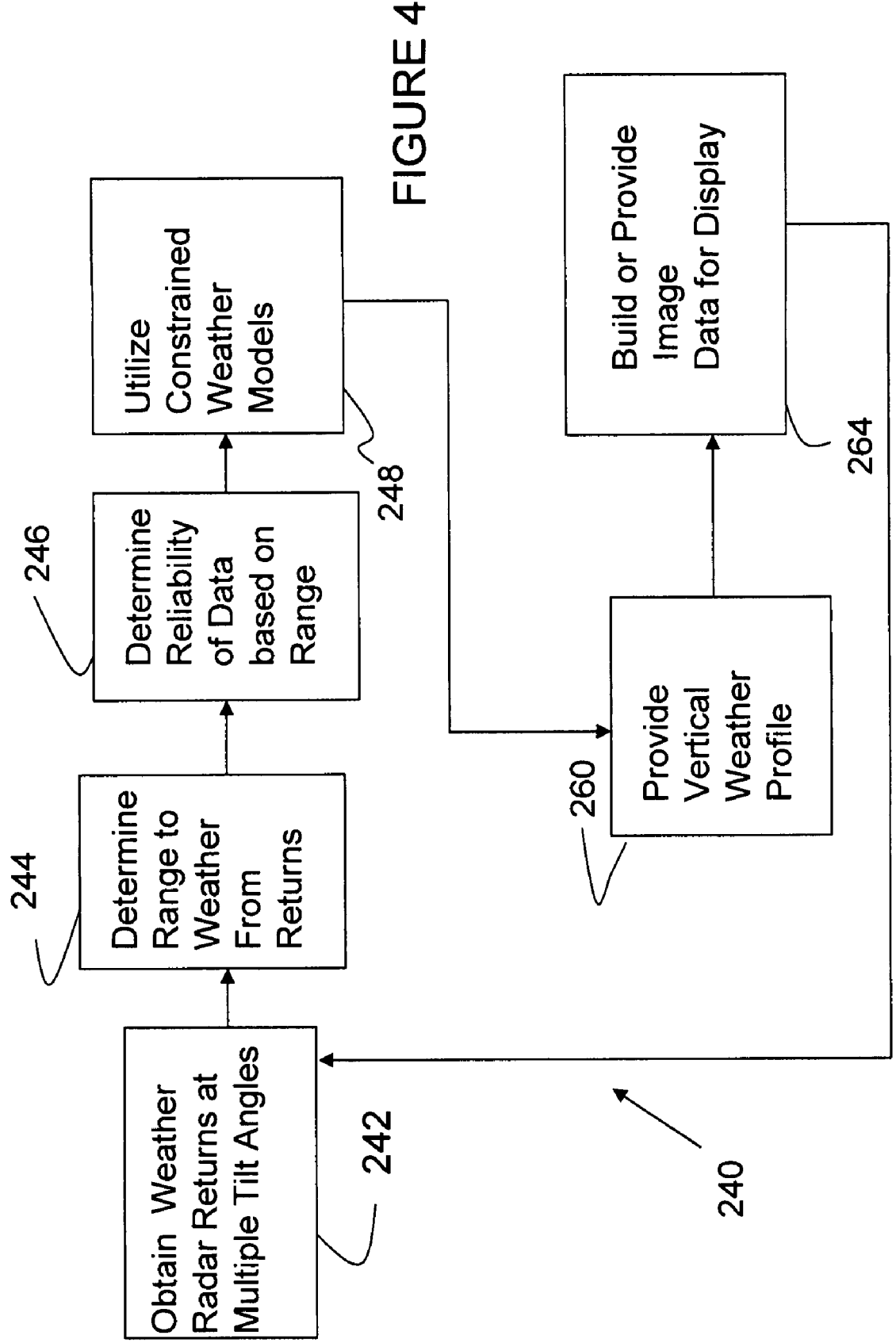
FIG. 4 is a flowchart illustrating a method of refining a generated vertical weather prediction, according to an exemplary embodiment.

With reference to FIG. 4, a flow chart 240 similar to flow chart 140 shows operation of system 200 in accordance with another exemplary embodiment. In a step 242, weather radar returns are obtained similar to step 142 described above. Using the weather radar returns are determination is made of the range associated with the weather radar returns in a step 244.

Based on the determined range, a determination is made in a step 246 of the reliability of the weather return data or a display generated based on the weather return data. At longer ranges, weather return data is often distorted by weather radar beam spreading, index of refraction variations, power fall-off, etc. Accordingly, a determination may be made whether the data should be constrained to reduce the potential of displaying erroneous weather profiles based on these distortions.

If the weather radar should be constrained, processor 208 may be configured to utilize a weather model that is constrained to reality based on the weather return data in a step 248. The model is influenced by the stored or received scan data. The model data may be, for example, modified to changes the parameter values associated with a hazardous weather cell to make the cell taller, fatter, longer, etc.

In a step 260, generating the vertical weather profile allows generation of longer range weather data that may be blended with climate models of weather at ranges where weather radar estimates of weather altitude are no longer sufficiently accurate to be meaningful. The image may then be displayed in a step 264.

Data blending can also be used to fuse vertical weather displays from other weather information sources, such as other sensors, other aircraft, ground based or space based weather data sources, etc. Any information may be used to improve the accuracy of the models and/or the weather radar return data.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Yet further, various representations of vertical weather prediction and equations for generating the vertical weather prediction can be utilized. Furthermore, other substitutions, modifications, changes, and omissions may be made in the design, operating conditions, and arrangement of the exemplary embodiments without departing from the scope of the invention as expressed in the appended claims.

The invention claimed is:

1. A weather radar system, comprising:
processing electronics for sensing weather, the processing electronics configured to utilize sensed weather data to generate a vertical weather prediction for a given altitude in response to a range and an azimuth; and
a display, wherein the display provides visual indicia of the vertical weather prediction in response to the processing electronics.

2. The weather radar system of claim 1, wherein the system being configured to operate in a first mode where the vertical weather prediction is not shown and a second mode where the vertical weather prediction is shown.

3. The weather radar system of claim 2, further comprising computer memory configured to store the vertical weather profile function at a memory location associated with the range and the azimuth.

4. The weather radar system of claim 3, wherein the vertical weather prediction is generated by updating coefficients to a vertical weather profile function that generates predicted reflectivity or other weather information such as hazard for each given altitude and range.

5. The weather radar system of claim 4, wherein the generated vertical weather prediction is modified based on a climate model.

6. The weather radar system of claim 5, wherein the sensed weather data is further blended with weather data from at least one remote weather source to generate the vertical weather prediction.

7. The weather radar system of claim 6, wherein the vertical weather prediction is generated based on a model that is constrained based on the sensed weather data.

8. The weather radar system of claim 1, wherein the display comprises a vertical profile view portion and a plan view portion and the vertical weather prediction is shown only on the vertical profile view portion.

9. A method of displaying weather on a vertical profile screen of a display associated with an aircraft weather radar system, the method comprising:
receiving radar returns;
processing the radar returns to determine a presence of weather;
determining a range and azimuth associated with the weather;
generating a vertical weather prediction using a predetermined function of the determined range and azimuth; and
providing the vertical weather prediction associated with the weather on the vertical profile screen.

10. The method of claim 9, further comprising modifying the vertical weather prediction based upon received radar returns.

11. The method of claim 10, wherein the vertical weather prediction is further modified based on weather data from at least one remote weather source.

12. The method of claim 9, wherein the vertical weather prediction is generated based on one or more typical convective cell vertical reflectivity gradients.

13. The method of claim 9, wherein the vertical weather prediction is provided in response to a mode of flight.

14. The method of claim 9, wherein the vertical weather prediction is provided based on a known accuracy of a sensed weather data at the range.

15. An apparatus for displaying weather for an aircraft, the apparatus comprising:
means for determining a presence of weather from weather radar returns;
means for generating a vertical weather prediction associated with the weather based upon a range and a horizontal location of the weather; and
means for displaying indicia of the weather using the vertical weather prediction.

16. The apparatus of claim 15, wherein the means for determining a presence is implemented using software.

17. The apparatus of claim 15, wherein the vertical weather prediction is generated based on at least one of a current location, a current geography, a current atmospheric state, a sensed weather feature size, a sensed weather feature area, a time and a date.

18. The apparatus of claim 15, wherein an altitude is determined by comparing power levels of returns at different tilt angles.

19. The apparatus of claim 15, wherein the indicia of the weather is displayed on a plan and vertical weather radar display.

20. The apparatus of claim 15, wherein the vertical weather prediction is provided based on a known accuracy of a sensed weather data at the range.

* * * * *